(12) United States Patent
Perenzoni et al.

(10) Patent No.: US 11,079,479 B2
(45) Date of Patent: Aug. 3, 2021

(54) DEVICE FOR MEASURING A DISTANCE AND METHOD FOR MEASURING SAID DISTANCE

(71) Applicant: FONDANZIONE BRUNO KESSLER, Trento (IT)

(72) Inventors: Daniele Perenzoni, Trento (IT); David Stoppa, Trento (IT); Leonardo Gasparini, Trento (IT); Matteo Perenzoni, Trento (IT); Nicola Massari, Trento (IT); Ulrich Zwölfer, Trento (IT); Kai Waslowski, Trento (IT); Alexander Bohli, Trento (IT); Michael Albert, Trento (IT); Friedhelm Wiethege, Trento (IT)

(73) Assignee: FONDAZIONE BRUNO KESSLER, Trento (IT)

( * ) Notice: Subject to any disclaimer, the term of this patent is extended or adjusted under 35 U.S.C. 154(b) by 491 days.

(21) Appl. No.: 16/031,640

(22) Filed: Jul. 10, 2018

(65) Prior Publication Data

US 2019/0018118 A1 Jan. 17, 2019

(30) Foreign Application Priority Data

Jul. 11, 2017 (EP) .................................. 17180791

(51) Int. Cl.
*G01C 3/08* (2006.01)
*G01S 7/4865* (2020.01)
(Continued)

(52) U.S. Cl.
CPC .............. *G01S 7/4865* (2013.01); *G01C 3/08* (2013.01); *G01C 15/002* (2013.01); *G01J 1/18* (2013.01);
(Continued)

(58) Field of Classification Search
CPC ...... G01S 7/4861; G01S 7/497; G01S 7/4808; G01S 7/4816; G01S 7/4865;
(Continued)

(56) References Cited

U.S. PATENT DOCUMENTS 8,773,642 B2 * 7/2014 Eisele ..................... G01S 17/10
356/4.01
2003/0128351 A1 7/2003 Schmidt et al.
(Continued)

FOREIGN PATENT DOCUMENTS

EP 3182154 A1 6/2017

OTHER PUBLICATIONS

Extended European Search Report dated Jan. 23, 2018, for EP Application No. 17180791.0.

*Primary Examiner* — Mark Hellner
(74) *Attorney, Agent, or Firm* — Nath, Goldberg & Meyer; Jerald L. Meyer

(57) ABSTRACT

Measuring device (1) suited to measure the distance (d) of a reference object (O), configured so that it performs a plurality of measuring operations ($A_i$) in succession and comprising emission means (2) suited to emit a light radiation (R), receiving means (3) comprising a sensitive area (31) which is sensitive to the light radiation (R) and which is provided with a number M of sensitive units (4), each one of the sensitive units (4) being configured to generate an electrical signal (S), a first processing unit (5) comprising $N_e$ processing elements (6), each one of said $N_e$ processing elements (6) being configured to receive the electrical signal (S) for determining the time of impact (t) of a photon (F) on the sensitive units (4) and for calculating the value of said distance (d). The measuring device (1) comprises a second processing unit (7) configured to receive the electrical signals (S), processing the electrical signals (S) in such a way as to select a number $N_u$ of sensitive units (4) impacted
(Continued)

by the photons (F), associating each one of the $N_u$ sensitive units (4) to one of the $N_e$ processing elements (6), in such a way that, at the moment of the successive measuring operation ($A_{i+1}$), the distance (d) is determined by each one of the $N_u$ sensitive units (4) selected.

15 Claims, 4 Drawing Sheets

(51) Int. Cl.
*G01S 7/481* (2006.01)
*G01C 15/00* (2006.01)
*G01S 7/497* (2006.01)
*G01S 7/4863* (2020.01)
*G01J 1/18* (2006.01)
*G01J 1/44* (2006.01)
*G01S 7/48* (2006.01)
*G01S 7/4861* (2020.01)
*G01S 17/10* (2020.01)

(52) U.S. Cl.
CPC ............... *G01J 1/44* (2013.01); *G01S 7/4808* (2013.01); *G01S 7/4816* (2013.01); *G01S 7/4861* (2013.01); *G01S 7/4863* (2013.01); *G01S 7/497* (2013.01); *G01S 17/10* (2013.01); *G01J 2001/442* (2013.01); *G01J 2001/4466* (2013.01)

(58) Field of Classification Search
CPC ..... G01S 7/4863; G01S 17/10; G01C 15/002; G01C 3/08; G01J 1/44; G01J 1/18; G01J 2001/4466; G01J 2001/442
USPC ........................................................ 356/5.01
See application file for complete search history.

(56) References Cited

U.S. PATENT DOCUMENTS

2009/0009747 A1    1/2009   Wolf et al.
2013/0015331 A1    1/2013   Birk et al.
2018/0341009 A1* 11/2018   Niclass ................. G01S 7/4863

* cited by examiner

DEVICE FOR MEASURING A DISTANCE AND METHOD FOR MEASURING SAID DISTANCE

BACKGROUND

1. FIELD

The invention concerns an improved device suited to measure the distance between the device itself and a reference object through the use of light radiation. The invention, furthermore, concerns a method for measuring said distance by means of said measuring device.

2. DESCRIPTION OF THE RELATED ART

Devices for measuring distances are known, which are based on the emission of light radiation directed towards a reference object and on the detection of said light radiation reflected by the reference object itself.

In detail, said measuring devices comprise means suited to emit said light radiation and receiving means comprising an area which is sensitive to said light radiation. The measuring devices belonging to the known art furthermore comprise a processing unit capable of determining the time interval that elapses between the emission of said light radiation by the emission means and the moment when said light radiation is detected by the receiving means. The value of said time interval, which is known as Time of Flight (ToF) in technical jargon and usually refers to the photons belonging to said light radiation, is directly proportional to the distance between the measuring device and the reference object. In this regard, the processing unit of the known measuring devices is usually configured in such a way as to determine the value of said distance starting from the ToF. Among other things, it is important to highlight that the expression "photons belonging to said light radiation" means only and exclusively the photons generated by said emission means, which therefore are distinct from the photons resulting from the background radiation, that is, from the environment light.

From the point of view of implementation, at least three possible architectures are known for said measuring devices, based on SPAD (Single-Photon Avalanche Diodes) and briefly described here below.

First of all, it should be pointed out that most of the architectures of the measuring devices belonging to the known art share the characteristic that the sensitive area of said receiving means is defined by a plurality of sensitive units, also known as "pixel" in technical jargon.

Each one of said sensitive units or pixels comprises, in fact, at least one SPAD.

In addition to the above, a further characteristic shared by all the embodiments known in the art is constituted by the fact that said processing unit is provided with a plurality of processing elements, each one of which is configured to convert said ToF into a digital representation that is used by the same processing unit in order to determine the distance between the measuring device and the reference object.

Usually, each one of said processing elements comprises an electronic device known under the acronym TDC (Time-to-Digital Converter), defined on the same surface on which the sensitive area is created and capable of carrying out said conversion.

Regarding a first possible architecture for the construction of the measuring device of the known art, this includes the creation of an association "one-to-one" between each one of said sensitive units belonging to the sensitive area and a processing element belonging to the processing unit.

This configuration, advantageously, makes it possible to obtain an optimal value of the signal-to-noise ratio (SNR), since the measuring device is capable of detecting the impact of at least one photon independently for each one of said sensitive units, therefore without running the risk of losing useful information.

This solution, however, poses some recognized drawbacks, first of all the fact that in practical application the architecture just described above is difficult to implement, as the definition of a number of processing elements at least equal to the number of sensitive units would determine an excessive size of the receiving means and, consequently, of the entire device. Furthermore, also the cost of this solution would be excessive. Furthermore, with said solution the portion occupied by the sensitive area of the receiving means, that is, the plurality of sensitive units capable of detecting the impact of one or more photons, would be considerably reduced due to the need to provide space for said processing elements.

In other words, the value of the so-called "fill factor" obtainable with the solution illustrated above, that is, the ratio between the actually light sensitive area and the entire surface of the receiving means, would be extremely low, even lower than 5%.

Therefore, said architecture is disadvantageously affected by the fact that the photons of the light radiation reflected by the reference object and impacting the receiving means at the level of the processing elements, which are present in a large number, cannot be detected, thus causing an excessive loss of useful information.

Finally, the large number of processing elements required determines, to disadvantage, high energy consumption for the operation of the receiving means and, consequently, of the entire measuring device.

In order to at least partially overcome the drawbacks illustrated above, a second architecture of said receiving means of the measuring devices has been developed.

According to said alternative second architecture, in fact, each one of the processing elements is associated with a plurality of sensitive units. Thus, this solution makes it possible to reduce the number of processing elements which are necessary for managing the sensitive units, with the consequent reduction of the total surface occupied by the receiving means. Furthermore, with the same surface occupied by said receiving means, this second embodiment makes it possible to obtain a higher fill factor compared to the first solution described above.

However, said second embodiment poses an important drawback, which is represented by less efficiency in the determination of said distance compared to the first architecture. In fact, said second embodiment determines a reduction of the useful band of each processing element placed at the disposal of each one of the sensitive units associated with it. More precisely, in the case where said processing element should be busy managing an event occurred in one of the sensitive units associated with it, the same would not be capable of detecting at the same time another event occurred in a different sensitive unit belonging to said plurality.

Therefore, to disadvantage, said architecture statistically determines a reduction of the signal-to-noise ratio compared to the first type of measuring device described above, due to the reasons which have just been explained.

In other words, the second type of measuring device carried out according to the known art, though featuring a more compact architecture than the one previously described, is capable of operating in an efficient manner only in the presence of a reduced luminous flux.

A third embodiment of said measuring device is also known, which is considered an intermediate solution between the two just described above. In fact, it includes the presence of a selection device, known under the name of "multiplexer" in technical jargon, between each processing element and a plurality of sensitive units.

Said selection device is capable of sending the signals generated by each one of said sensitive units to the corresponding processing element in different time intervals. In this way the signals generated by all of the sensitive units associated with the same processing element can be processed by the latter. However, a loss of useful information may occur also in this case, when a photon impacts the sensitive surface of a sensitive unit in a time interval during which the processing element is busy managing a different processing unit. Furthermore, said third embodiment poses a further recognized drawback which lies in that it takes more time to carry out the measuring operations compared to the previous measuring devices of the known art, due to the selection sequence performed by the multiplexer.

In the attempt to increase the signal-to-noise ratio of the measuring devices just described above, the patent U.S. Pat. No. 8,773,642 suggested that during the setting step a first assessment operation be carried out in order to assess the sensitive units actually impacted by the light radiation emitted by the emission means, and to successively determine the value of said distance taking in consideration only and exclusively the signals generated by said identified sensitive units.

However, to disadvantage, said embodiment loses its effectiveness at the moment when, during the various measuring operations, the external operating conditions change with respect to the conditions observed during said setting step.

In addition to the disadvantages of the specific architectures just described above in relation to the measuring devices made according to the known art, it is possible to mention a further drawback shared by all of them.

This drawback, in particular, occurs in the case where there is a high luminous flux impacting the sensitive area of the receiving means, independently of whether it is due to the light radiation emitted by the emission means or to the background noise, for example sunlight.

In fact, a high luminous flux can determine the phenomenon known as "pile-up", which in turn determines the quick saturation of the sensitive units belonging to the sensitive area. More specifically, in the case where each one of the sensitive units comprises one or more SPADs, the presence of said high luminous flux in turn determines the increase of the time of inactivity, known as idle time in technical jargon, of the same SPADs. This means, to disadvantage, that the risk of loss of useful information, meaning the risk of failure to detect the impact of photons belonging to the light radiation emitted by the emission means, can reach unacceptable values.

Again, the presence of said "pile-up" phenomenon in the case of a high luminous flux determines, to disadvantage, a drastic reduction of the actual fill factor value following said sudden saturation of the sensitive units.

This means that, even if the receiving means statically have a high fill factor value, if they are overexposed to a high luminous flux, said fill factor value decreases dynamically, and may even be zeroed.

The present invention intends to overcome all of the drawbacks described above.

SUMMARY

In particular, it is one of the objects of the invention to provide a measuring device which is capable of maintaining a high signal-to-noise ratio in any operating condition, also in the presence of a high luminous flux.

Consequently, it is the object of the invention to provide a measuring device which is capable of determining with high precision the value of the distance between the device itself and a reference object, also in the presence of a high luminous flux.

It is another object of the present invention to provide a measuring device which is capable of maintaining high precision in the determination of said distance, also in the presence of a sudden change of the external measuring conditions.

It is a further object of the present invention to provide a measuring device with a high static and dynamic fill factor.

It is another object of the present invention to provide a measuring device characterized by reduced size and simplified architecture.

It is a further object of the present invention to provide a measuring device involving moderate energy consumption.

These objects are achieved through the development of a measuring device suited to measure the distance of at least a reference object, configured so that it performs a plurality of measuring operations (Ai) in succession. The device uses emission means suited to emit a light radiation directed towards the reference object during a predetermined time interval for each one of the measuring operation (Ai), and receiving means comprising a sensitive area which is sensitive to the light radiation reflected by the reference object, the sensitive area being provided with a number M of sensitive units. Each of the sensitive units is configured to generate an electrical signal following the impact of at least one photon on its sensitive surface. A first processing unit comprises Ne processing elements, where Ne<M. Each of the Ne processing elements is configured to receive the electrical signal generated by one of the M sensitive units and to determine the time of impact of said at least one photon on the sensitive units with respect to a reference electrical signal. The first processing unit is configured to calculate, at the moment of each one of the measuring operations (Ai), the value of the distance based on the time of impact related to at leat one of the M sensitive units. A second processing unit is configured in such a way as to perform the following steps at the moment of each of the measuring operations (Ai). The measuring device receives the electrical signals generated by the M sensitive units. The electrical signals are processed to select a number Nu of sensitive units impacted by the photons belonging to the light radiation, where Nu⇐Ne. Each one of the Nu sensitive units are associated with one of the Ne processing elements, in such a way that, at the moment of the successive measuring operation (Ai+1), the distance is determined by the first processing unit based on the time of impact of at least one of the photons related to each one of the Nu sensitive units selected.

The objects are further achieved also through the measuring method implemented by means of the measuring device.

BRIEF DESCRIPTION OF THE DRAWINGS

The said objects, together with the advantages that are illustrated below, are highlighted in the description of some preferred embodiments of the invention which is provided by way of non-limiting example with reference to the attached drawings, wherein.

DETAILED DESCRIPTION OF THE PREFERRED EMBODIMENTS

Figure 1:
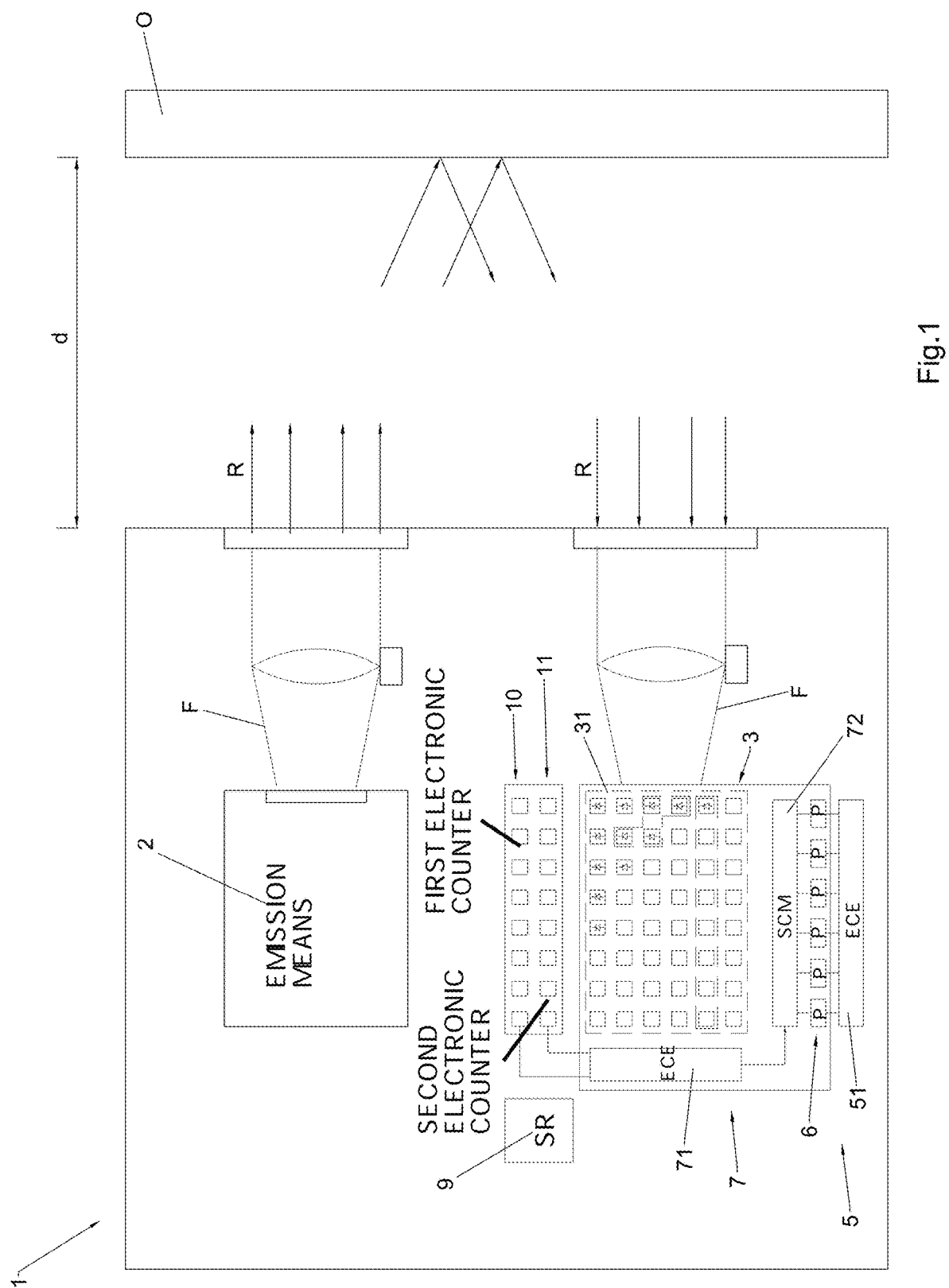
FIG. 1 shows a schematic view of the measuring device that is the subject of the invention.

The measuring device that is the subject of the invention and is suited to measure the distance d of a reference object O, or of a plurality of reference objects O, is represented in FIG. 1, where it is indicated as a whole by 1.

As explained below, the measuring device 1 is configured to carry out in succession a plurality of measuring operations $A_i$ for the purpose of determining the value of said distance d with great precision.

As shown in FIG. 1, the measuring device 1 of the invention comprises emission means 2 suited to emit light radiation R directed towards the reference object O during a predetermined time interval I for each one of said measuring operations $A_i$ in sequence.

Figure 2:
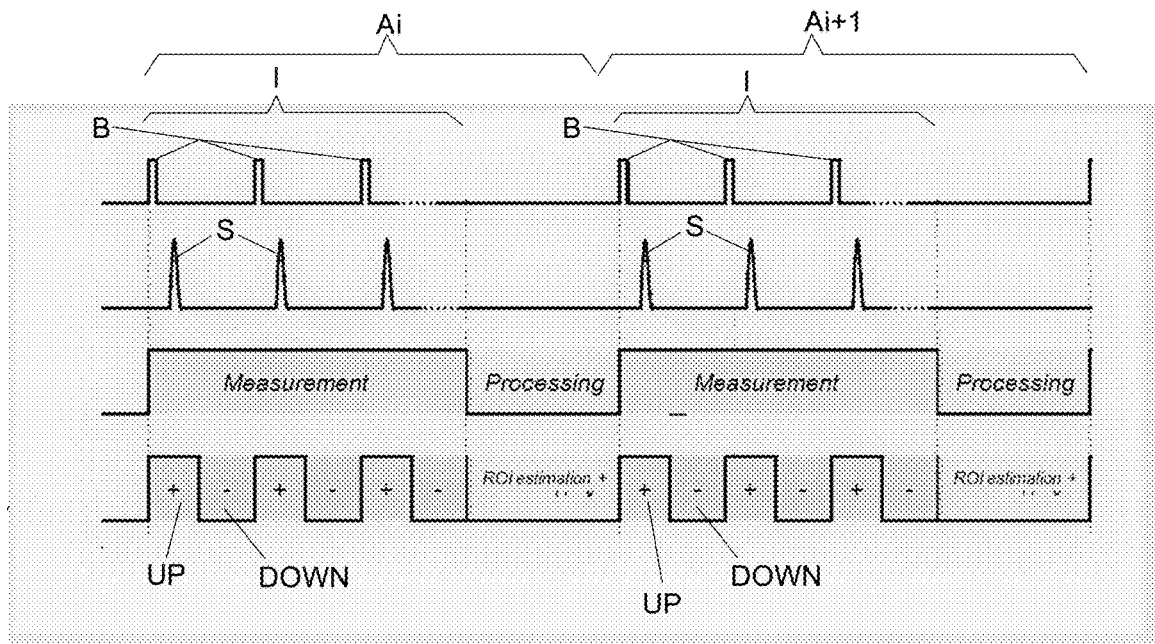
FIG. 2 shows the time chart of two measuring operations $A_i$ carried out in sequence by means of the measuring device that is the subject of the invention.

Said plurality of measuring operations $A_i$ in sequence is illustrated in the time chart shown in FIG. 2.

According to the preferred embodiment of the invention, said emission means 2 are configured to emit, at each time interval I related to each one of the measuring operations $A_i$, light radiation R of the type pulsed with a predefined number X of pulses B, as shown in FIG. 2.

Regarding, furthermore, the emission means 2, they preferably but not necessarily comprise a laser source of the punctiform type. It cannot be excluded, however, that according to different embodiments of the measuring device 1 of the invention, said emission means 2 may comprise a LED source or one or more laser diodes.

The measuring device 1 that is the subject of the invention furthermore comprises receiving means 3 provided with an area 31 which is sensitive to said light radiation R reflected by the reference object O, as schematically shown in FIG. 1. In general terms, it is clear that the sensitive area 31 is sensitive to any luminous flux whose photons F impact it.

Figure 3:
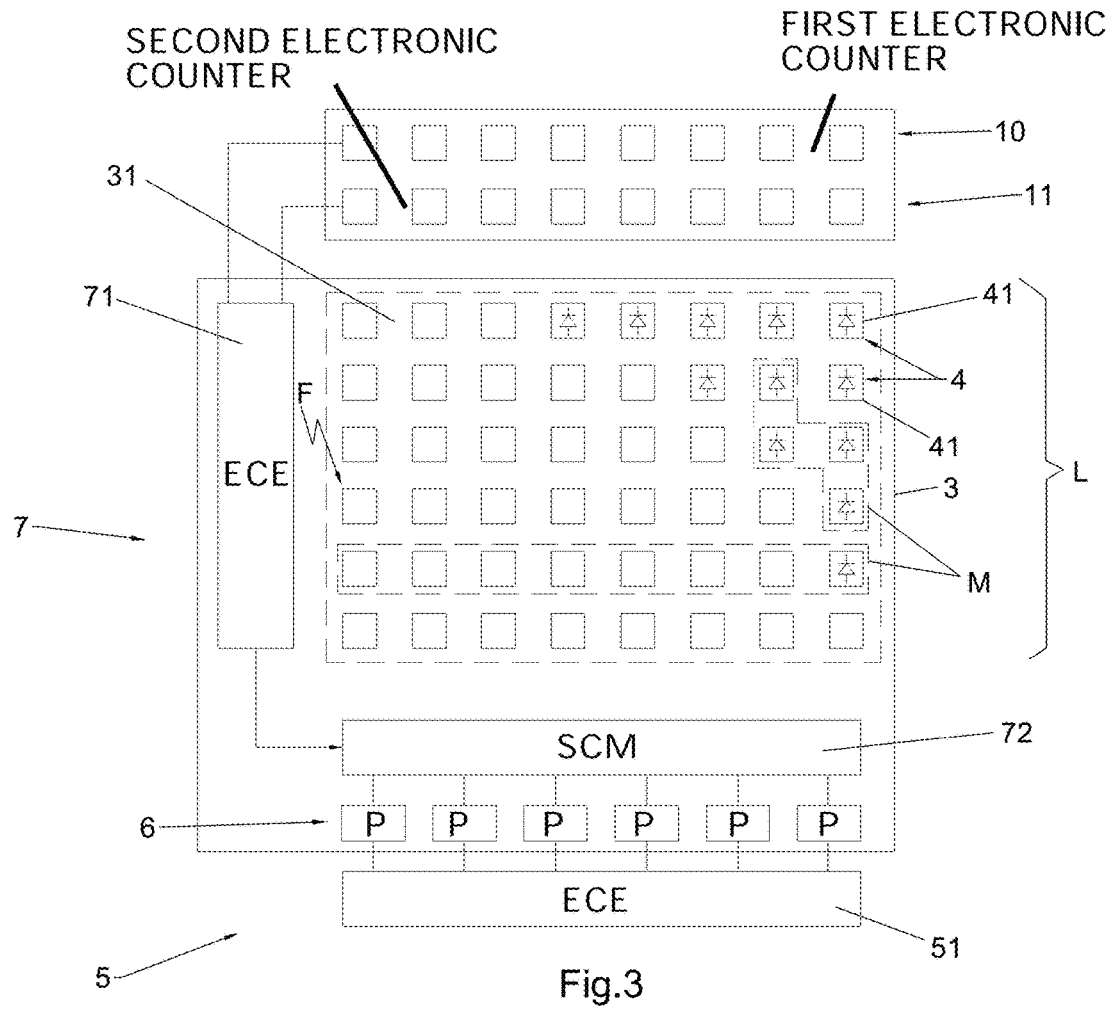
FIG. 3 shows a schematic view of the receiving means of the invention, the first processing unit and the second processing unit belonging to the measuring device that is the subject of the invention.

As shown in FIG. 3, the sensitive area 31 is provided with a number M of sensitive units 4, preferably arranged as a matrix in such a way as to define one or more columns and one or more rows. In particular, according to the invention each one of said M sensitive units 4 is configured in such a way that it generates an electrical signal S following the impact of at least one photon F on its sensitive surface 41.

In even greater detail, according to the preferred embodiment of the measuring device 1 of the invention, the sensitive area 31 comprises a number L of sensitive units 4.

In this case the M sensitive units 4 represent, among all the L sensitive units 4, those actually enabled for the generation of said electrical signal S.

Therefore, evidently, the number M may be less than or equal to the number L. In other words, the remaining L-M sensitive units 4, except the case where all the L sensitive units are enabled (M=L), though being physically present in said sensitive area 31 of the receiving means 3, are disabled and therefore are not capable of generating an electrical signal S in case of impact of a photon F on its sensitive surface 41. As described in detail below, it is possible to decide in advance whether to enable one of the L sensitive units 4 or not, during a setting step performed on the measuring device 1 of the invention.

Also the advantages obtained through the implementation of said setting step are described here below.

However, alternative embodiments of the measuring device 1 of the invention may not include the possibility to enable the sensitive units 4 or not.

Therefore, in this case all of the L sensitive units 4 defined in the sensitive area 31 are enabled. In other words, M coincides with L.

According to the preferred embodiment of the measuring device 1 that is the subject of the invention, each one of said L (M if only the enabled ones are taken in consideration) sensitive units 4 comprises a SPAD (Single Photon Avalanche Diode) 81.

Figure 4:
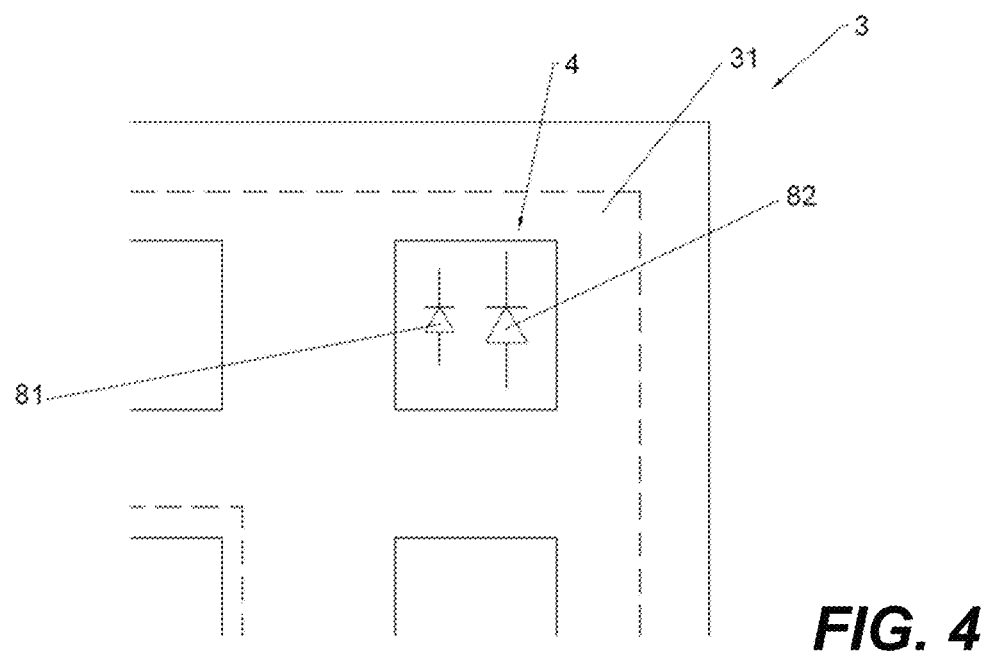
FIG. 4 shows a schematic view of the structure of a sensitive unit according to a variant embodiment of the measuring device that is the subject of the invention.

It cannot be excluded that, according to a variant embodiment of the invention, one or more of said L (M) sensitive units 4 may comprise two SPADs 81 and 82 whose sensitive surfaces have different sizes, as schematically shown in FIG. 4.

Furthermore, it cannot be excluded that in different alternative embodiments of the invention each sensitive unit 4 may comprise more than two SPADs.

The functionality and the advantages related to the presence of said two SPADs in one or more of the L (M) sensitive units 4 are described in detail here below.

A further functional component belonging to the measuring device 1 of the invention is a first processing unit 5 which in turn comprises a number $N_e$ of processing elements (P) 6, where, according to the invention, $N_e$<M. Each one of the $N_e$ processing elements (P) 6, in particular, is configured so that it receives the electrical signal S generated by one of the M sensitive units 4 and determines the time of impact t of the photon F which impacts the same sensitive unit 4. More precisely, in the measuring device 1 of the invention an exclusive association "one to one" is created between one of the M sensitive units 4 and a processing element 6.

Furthermore, as already explained above, the time of impact t is the time interval (or ToF) which elapses between the emission of said pulsed light radiation R by the emission means 2 and the impact of at least one of its photons F on the sensitive surface 41 of the specific sensitive unit 4.

Furthermore, in the measuring device 1 according to the invention the first processing unit 5 is configured so that it calculates, at the moment of each one of the measuring operations $A_i$, the value of the distance d based on the time of impact t related to at least one of the M sensitive units 4. It will be shortly clear, following the description of the characteristics that distinguish the measuring device 1 of the invention from the known devices, how the number of sensitive units 4 to be taken in consideration for the calculation of said distance d at the moment of each measuring operation $A_i$ is defined.

However, in the case where several sensitive units 4 and, therefore, several electrical signals S processed by several processing elements 6 are taken in consideration, the first processing unit 5 is configured to actuate processing logics and algorithms of the known type for the determination of a single value of said distance d starting, in fact, from said plurality of electrical signals S.

According to the preferred embodiment of the invention, the $N_e$ processing elements 6 of the first processing unit 5 are $N_e$ TDCs (Time-to-Digital Converter) which, as explained above, are capable of measuring the time elapsed between a reference signal (clock) and the time of arrival of the electrical signal S related to said time of impact and of converting said measurement into a digital representation.

Furthermore, the first processing unit 5 comprises a further electronic calculation element (ECE) 51 operatively connected to each one of said $N_e$ processing elements 6 and configured, in fact, to calculate said distance d.

Preferably but not necessarily, the first processing unit 5 is physically made in the same support in which the sensitive area 31 of said receiving means 3 is defined.

However, it cannot be excluded that, according to different embodiments of the invention, the first processing unit 5 may be made as an independent element with respect to the receiving means 3, provided that, obviously, it is operatively connected to the latter.

Furthermore, according to an alternative embodiment of the measuring device 1 of the invention, it may be possible to define the $N_e$ processing elements 6 on the same support used for said sensitive area 31, while the electronic calculation element 51 is defined as an independent element.

According to the invention, the measuring device 1 comprises, furthermore, a second processing unit 7 configured in such a way that at the moment of each one of the measuring operations $A_i$ it performs a series of actions which are described below. First of all, the second processing unit 7 is configured to receive as an input the electrical signals S generated by the M sensitive units 4. More precisely, therefore, the second processing unit 7 is operatively connected to the sensitive area 31 so that it can receive said electrical signals S independently of the first processing unit 5.

The second processing unit 7 is configured in such a way that, once said electrical signals S have been received, at the end of the emission time interval I for each one of the measuring operations $A_i$, it processes the electrical signals S so as to select a number $N_u$ of sensitive units 4 impacted by at least one photon F actually belonging to the light radiation R. As will be shortly explained, the number $N_u$ of sensitive units 4 is selected in such a way that it is lower than or even equal to the number $N_e$ of processing elements 6 ($N_u \Leftarrow N_e$).

The second processing unit 7 is configured in such a way that, once said $N_u$ sensitive units 4 have been selected, it associates each one of them with one of the $N_e$ processing elements 6, so that, at the moment of the successive measuring operation $A_{i+1}$, said distance d is determined by said first processing unit 5 based on the time of impact t of at least one photon F related to each one of the $N_u$ sensitive units 4 selected.

A first advantage obtained through said procedure, performed cyclically at the moment of each measuring operation $A_i$, consists in the identification of a region of interest comprising one or more sensitive units 4 within the sensitive area 31, on which the impact of the photons F belonging to the light radiation R emitted by the emission means 2 is actually expected to take place.

In other words, considering only the electrical signals S generated by said selected $N_u$ sensitive units 4, signals S which very probably were originated by the impact of one of the photons F of said light radiation R, a substantial increase in the signal-to-noise ratio is obtained, which in turn ensures higher precision in the determination of the value of the distance d. In fact, all the remaining $M-N_u$ sensitive units 4 not selected may generate an electrical signal S following the impact of photons F related to the background noise, like sunlight, for example, on their sensitive surface 41, and consequently cause a drastic reduction in said signal-to-noise ratio.

A further advantage, determined by the fact that the second processing unit 7 is configured so as to cyclically perform, at the moment of each measuring operation $A_i$, said sequence of actions, consists in a periodical adaptation of the position, shape and/or size of said region of interest, constituted by said $N_u$ sensitive units 4, when the position of the reference object O with respect to the measuring device 1 varies and/or when the light intensity on the receiving means 3 varies due to a change occurred in the external environmental conditions or in the emitted light radiation R itself.

In simple words, the measuring device 1 of the invention is capable of dynamically varying the position, shape and/or size of said region of interest based on the light conditions detected during the previous measuring operation $A_{i-1}$, for the purpose of improving the signal-to-noise ratio and, consequently, thus increasing precision in the determination of said distance d during each measuring operation $A_i$.

As regards, more specifically, the second processing unit 7, according to the invention it is configured so as to calculate the number of occurrences related to the impact of at least one photon F, hereinafter indicated by Fp, belonging to the light radiation R for each one of the M sensitive units 4 during the pre-established time interval I related to each measuring operation $A_i$. In other words, the second processing unit 7 is configured to determine a plurality of histograms, each one of which is related to the events, meaning said number of occurrences, which take place during the emission time interval I on each one of the M sensitive units 4 taken individually or together with other sensitive units 4.

More precisely, when an event is detected on a sensitive unit 4, the processing unit 7, preferably a TDC, associated with said sensitive unit 4 generates a digital code related to the Time of Flight of said event with respect to a reference signal (clock). However, in order to extrapolate the information on the ToF, it is necessary to accumulate a plurality of Times of Flight and produce a histogram featuring the TDC codes (from zero to full scale) on the X-axis and the number of occurrences of each code generated on the Y-axis. In even greater detail, in order to allow the photons F belonging to the light radiation R to be distinguished from the photons F related to the background noise, indicated more precisely by Fb, which impact the M sensitive units 4, the second processing unit 7 is configured so that it calculates the occurrences by making in sequence at least one first count UP of said occurrences during the emission of the light radiation R by the emission means 2 and at least one second count DOWN in the absence of said light radiation R. The representation of this sequence of steps is schematically shown in FIG. 2. The second processing unit 7 is configured in such a way that, following each sequence of at least one first count UP followed by at least one second count DOWN, it deducts the occurrences calculated during said two counts from each other. This last action advantageously makes it possible to filter the electrical signals S generated by the impact of photons Fb belonging to the background noise on each one of the M sensitive units 4, thus also allowing the second processing unit 7 to consider, for the calculation of the occurrences, exclusively those electrical signals S generated by the impact of at least one photon Fp actually belonging to the light radiation R.

To clarify this aspect, consider the case of a given sensitive unit 4 on which there is no impact of any photon Fp belonging to the light radiation R, but on which it is possible to detect the presence of a background noise both during the first count UP and during the second count DOWN. In this situation, an event which in turn generates an electrical signal S having the same intensity during both of the counts UP and DOWN can be observed or not, depending on the light intensity of said background noise. Therefore, in both cases, the subtraction calculation performed by the second processing unit 7 makes it possible to filter the anomalous event due to the background noise and thus makes it possible to exclude it in order to calculate the occurrences. In the case, instead, of a given sensitive unit 4 on which there is an impact of a photon Fp belonging to the light radiation R, independently of the presence or absence of a background noise, the event which certainly takes place during the first count UP will generate an electrical signal S whose intensity is much higher than the intensity of any electrical signal S generated by a potential event due to the background noise during the second count DOWN. Therefore, in this case, when said subtraction calculation is performed the event due to the impact of a photon Fp actually belonging to the light radiation R is not filtered by the second processing unit 7 and thus is correctly considered as an occurrence.

According to the preferred embodiment of the measuring device 1 that is the subject of the invention, the second processing unit 7 is configured to repeat X times the sequence comprising a single first count UP followed by a single second count DOWN, where X represents, as already explained above, the number of pulses B of the light radiation R emitted during the time interval I for each one of the measuring operations $A_i$.

It cannot be excluded, however, that according to alternative embodiments the measuring device 1 of the invention may be configured so as to make it possible to perform, for each sequence of counts during said time interval I, two or more consecutive first counts UP followed by two or more consecutive second counts DOWN. In particular, preferably, the measuring device 1 may be configured so as to make it possible to choose the number of consecutive first counts UP and the number of consecutive second counts DOWN for each sequence, equal to a power of 2.

Said possible alternative to the preferred embodiment advantageously assumes considerable importance at the moment when it is necessary to arrange two measuring devices 1 of the invention in adjacent positions. Their closeness, in fact, may cause a mutual interference, as the light radiation R emitted by a first one of said measuring devices 1 may light the receiving means 3 of the second measuring device 1, and vice versa. In other words, in this case, there is the risk that the efficiency of each measuring device 1, in particular the ability to correctly select the $N_u$ sensitive units 4, in addition to being negatively influenced by the presence of the background noise due to the environmental conditions, will be further reduced by the presence of the light radiation R emitted by the second one of the two measuring devices 1.

Advantageously, in order to avoid or limit said further source of disturbance, the invention makes it possible to select, for the two adjacent measuring devices 1, different values for the number of consecutive repetitions of the first counts UP and of the second counts DOWN, with the only restriction that said number, as already said, must be a power of 2.

Figure 5:
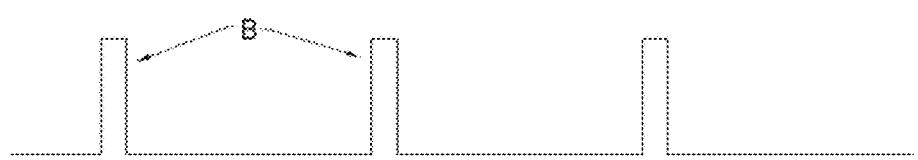
FIG. 5 shows the time chart of the sequence of Up-Down counts of two measuring devices according to the invention.
Figure 5:
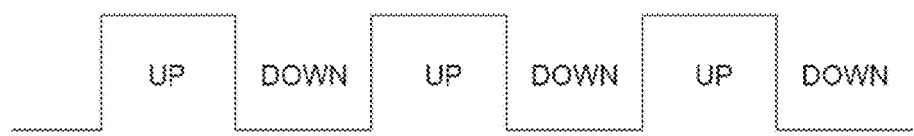
Figure 5:
Figure 5:
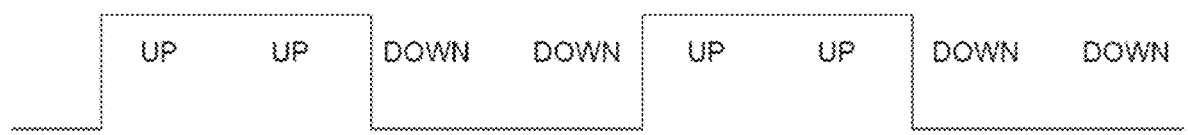

In order to clarify this aspect consider, for example, the case where the first measuring device 1 is configured so that it repeats several times the sequence comprising a single first count UP followed by a single second count DOWN, while the second measuring device 1 is configured so that it repeats several times the sequence comprising two consecutive first counts UP followed by two consecutive second counts DOWN, as schematically shown in FIG. 5.

In this way, advantageously, even if the light radiation R of the first measuring device 1 should unconveniently light the second measuring device 1 and vice versa, and both the second processing units 7 should perform the subtraction calculations described above for each one of the calculation sequences, the events detected on a first measuring device 1 and determined by the light radiation R of the second measuring device 1 would advantageously be filtered and therefore would not be considered for the calculation of said occurrences. The same situation is valid also if the roles of the two measuring devices 1 are reversed.

However, it cannot be excluded that, in order to obtain the same advantage, the second processing units 7 and the emission means 2 of both of the measuring devices 1 can be configured so as to repeat the sequence of first counts UP followed by second counts DOWN at random time instants within the emission time interval I. Also in this case, in fact, the non-coincidence of the time instants in which said first and said second counts UP and DOWN are performed in the two adjacent measuring devices 1 makes it possible to eliminate their mutual disturbance.

The solutions just described above for two measuring devices 1 remain equally valid in the presence of more than two measuring devices 1 according to the invention.

With regard, once again, to the second processing unit 7 related to the preferred embodiment of the invention, this is configured to select, following said determination of the occurrences, the number $N_u$ of sensitive units 4 among the M sensitive units 4 based on the decreasing order of said number of occurrences, at the moment of each measuring operation $A_i$.

More precisely, according to the preferred embodiment a number $N_u$ of sensitive units 4 equal to the number $N_e$ of processing elements 6 is selected in decreasing order, in such a way as to associate one of the $N_u$ sensitive units 4 with each one of the $N_e$ processing elements 6.

Alternatively, according to a second embodiment of the invention the second processing unit 7 may be configured so as to select only the M sensitive units 4 featuring a number of occurrences exceeding a certain pre-established value. In this case, therefore, for each measuring operation $A_i$ it would be possible to select a number $N_u$ of sensitive units 4 even smaller than the number $N_e$ of processing elements 6. In this case, only a number of the $N_e$ processing elements 6 equal to $N_u$ would be associated with one of the $N_u$ sensitive units 4.

Furthermore, according to a third different embodiment of the measuring device 1 of the invention, the second processing unit 7 may be configured so as to select, always according to the occurrences, a number $N_u$ of sensitive units 4 which is smaller than the number $N_e$ of processing elements 6. The second processing unit 7 may be configured in such a way that, following said selection, each one of said $N_e$ processing elements 6 is associated with one of the $N_u$ sensitive units 4 selected or further sensitive units 4 that are in the neighbourhood of one of said $N_u$ sensitive units 4, according to a predefined distribution pattern. Clearly, the total number of the selected $N_u$ sensitive units 4 and, possibly, those adjacent to them, cannot exceed the number $N_e$ of sensitive elements 6, as a primary object of the measuring device 1 of the invention is to obtain an association "one to one" between the sensitive units 4 and the processing elements 6.

As already mentioned above, the measuring device 1 of the invention is preferably but not necessarily configured to allow a setting step for the receiving means 3 to be performed. In particular, said setting step has the purpose of making it possible to set in advance the "enabled" or "disabled" condition of each one of the L sensitive units 4, following which said M sensitive units 4 are selected as the only sensitive units 4 actually enabled for the generation of said electrical signal S.

For this purpose, the measuring device 1 that is the subject of the invention comprises a storage register 9 (SR) in which it is possible to store in advance the "enabled" or "disabled" condition of each one of said L sensitive units 4.

Advantageously, enabling a limited number M of sensitive units 4 compared to their total number (L sensitive units 4) through said setting step makes it possible to increase the signal-to-noise ratio in a permanent manner and to limit the number of sensitive units 4 to be analysed at the moment of each measuring operation in order to select said $N_u$ sensitive units 4.

In fact, by checking in advance, through said setting step, what sensitive units 4 among the L sensitive units 4 are actually lit by the light radiation R emitted by the emission means 2 as the distance between the measuring device 1 and a reference object O varies, it is possible to permanently exclude those sensitive units 4, among the L sensitive units, which on the other hand will never be a source of useful information.

Figure 6:
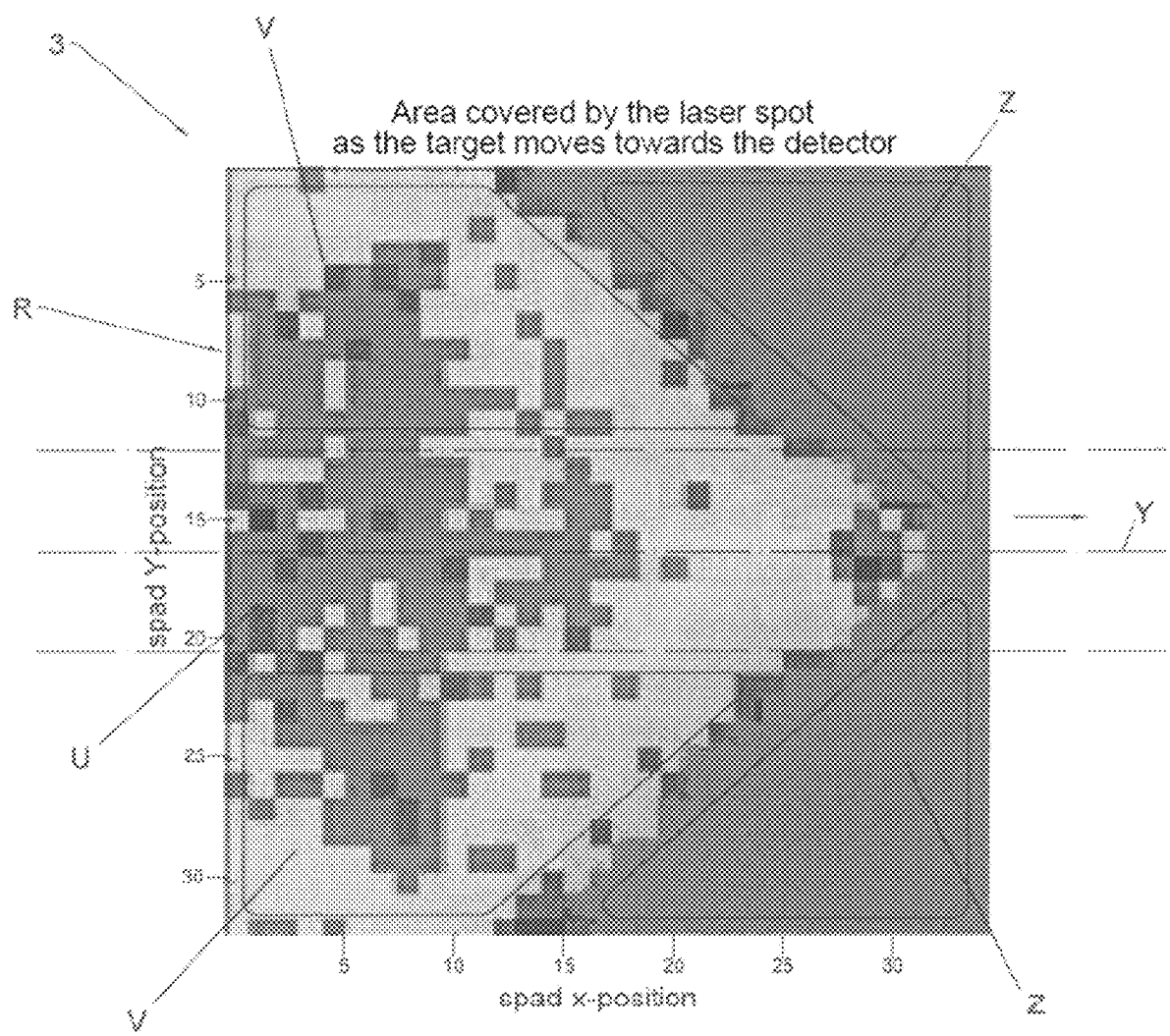
FIG. 6 shows the typical wedge shape of the light radiation that impacts the sensitive area of the measuring device of the invention as the distance between the latter and a reference object varies.

The conviction that it is possible to determine in advance said number M of enabled sensitive units 4 originates from the assumption that, as is known, the dimension of the light radiation R that impacts the sensitive area 31 of the receiving means 3 is inversely proportional to the value of said distance d between the measuring device 1 and the object O. Furthermore, it is also known that, due to a triangulation effect, said light radiation R reflected by the object O tends to move in a linear manner on the sensitive area 31, always depending on said distance d. FIG. 6 shows the typical wedge configuration of the light radiation R that impacts the sensitive area 31 as said distance d varies. In particular, the axis Y indicates the direction of travel of said light radiation R as the distance d varies and the arrow indicates the sense in which it travels as the same distance d increases.

From this representation it is possible to observe that part of the L sensitive units 4 belonging to the sensitive area 31, indicated by Z in FIG. 6, is never lit by the light radiation R. Consequently, said sensitive units 4 will never generate an electrical signal S useful for the purpose of calculating the value of said distance d. Therefore, they can be permanently disabled. On the contrary, in the case where said sensitive units 4 which are never lit should be enabled, they could contribute to the introduction of noise and therefore could reduce the value of said signal-to-noise ratio.

Following said setting step, the number M of enabled sensitive units 4 can be further reduced, as the sensitive units 4 indicated by V in FIG. 6, although lit by the light radiation R when the object O is in a close position with respect to the measuring device 1, do not provide any additional useful information compared to the useful information obtainable from the electrical signals S generated by the sensitive units 4 belonging to the band indicated by U.

Therefore, to conclude, the possibility to carry out said setting step makes it possible to identify and enable exclusively a limited number M of sensitive units 4 distributed along said axis Y, thus contributing to increasing said signal-to-noise ratio while at the same time maintaining the quality of the usable information unaltered.

However, according to alternative embodiments of the invention, the measuring device 1 of the invention may not be configured to allow the execution of said setting step and thus to make it possible to set the "enabled" or "disabled" condition of said L sensitive units 4 in advance.

Again, alternatively, it cannot be excluded that the measuring device of the invention can be configured in such a way as to allow said setting step to be performed with no need to cyclically select the $N_u$ sensitive units 4.

Furthermore, focusing again on the variant embodiment of the measuring device 1 of the invention illustrated in FIG. 4 and comprising one or more sensitive units 4 provided with two SPADs 81 and 82 whose sensitive surfaces have different sizes, the corresponding second processing unit 7 is configured in such a way that at the moment of each one of the measuring operations $A_i$ said two SPADs 81 and 82 are enabled individually or jointly for each one of said sensitive units 4.

Preferably but not necessarily, in the case of said variant embodiment, the second processing unit 7 is configured to enable said two SPADs 81 and 82 individually or jointly based on the number of photons F, that is, on the light intensity, impacting the sensitive area 31 during the previous measuring operation $A_{i-1}$. In particular, the second processing unit 7 is configured to determine said number of photons F based on the electrical signals S generated by the M sensitive units 4 and received as an input by said second processing unit 7. This further characteristic advantageously allows the measuring device 1 that is the subject of the invention to dynamically and automatically reset, at the moment of each measuring operation $A_i$, the value of the fill factor for each sensitive unit 4, and therefore the sensitivity of the sensitive area 31 to the light radiation R, based on the intensity of the same and on the background noise, if any, detected in the previous cycle.

In particular, for each sensitive unit 4 comprising said two SPADs 81 and 82 a minimum fill factor value is obtained when only the SPAD 81 with smaller sensitive surface is enabled, an intermediate fill factor when only the SPAD 82 with larger sensitive surface is enabled and, finally, a maximum fill factor value when both of the SPADs 81 and 82 are enabled.

Consequently, in the case of intense luminous fluxes, that is, in the presence of a high number of photons F impacting the sensitive area 31, said function of the measuring device 1 of the invention automatically lowers the sensitivity of the M sensitive units 4, consequently avoiding their sudden saturation ("pile-up") and the drastic reduction of the total fill factor value of the receiving means 3.

As an alternative to the solution just described above, in order to vary the sensitivity of the sensitive area 31 to the light radiation R and to the background noise and, therefore, to avoid the drawbacks described above in the case of a high luminous flux, in the measuring device 1 according to a different embodiment of the invention the second processing unit 7 may be configured so as to vary, at the moment of each one of the measuring operations $A_i$, the biasing voltage $V_{bias}$ of one or more of the M sensitive units 4 in a manner inversely proportional to the number of photons F impacting the sensitive area 31 during the previous measuring operation $A_{i-1}$. Furthermore, according to a variant embodiment of the invention comprising all or part of the characteristics described up to now, the measuring device 1 may be configured in such a way as to activate, at the moment of each one of the measuring operations $A_i$, the M sensitive units 4 in different time instants within the pre-established time interval I, based on the spatial coordinates of each one of them at the level of the sensitive area 31.

The word "activate" refers to the command, known as "gating" in technical jargon, which determines the opening of the observation window of each one of the M sensitive units 4 within which a photon F impacting the respective sensitive surface 41 can be detected. Clearly, said observation window will close, in the case of the SPADs, in the instant when said impact takes place. Also this further function of the measuring device 1 of the invention contributes to increasing the signal-to-noise ratio.

In fact, since, as already explained, the position in which the photons Fp of the light radiation R impact the sensitive area 31, due to said triangulation effect, varies along the axis Y according to the distance d between the same device 1 and the reference object O, and since also the time of impact t of said photons Fp obviously varies according to said distance d, during the emission time interval I it is possible to delay the activation of the M sensitive units 4 based on their spatial position in the sensitive area 31, without causing any loss of useful information. On the contrary, progressively delaying the activation of the sensitive units 4 based on their position proportionally reduces the amplitude of their observation window and thus the risk of anomalous events taking place due to the impact of photons Fb not belonging to the emitted light radiation R.

Finally, regarding the precise architecture of the processing unit 7 according to the preferred embodiment of the measuring device 1 of the invention, said architecture includes the definition of a first electronic counter 10 and of a second electronic counter 11 shared by all the sensitive units 4 belonging to the same column of the matrix mentioned above. In particular, said first electronic counter 10 is configured to count the occurrences related to any of said sensitive units 4 of the same column during the first count UP, while the second electronic counter 11 is configured to count said occurrences during the second count DOWN.

It cannot be excluded that, in different embodiments of the invention, the second processing unit 7 may comprise a first electronic counter 10 and a second electronic counter 11 exclusively associated with each one of the L sensitive units 4. Furthermore, it cannot be excluded that, in different variant embodiments of the measuring device 1 of the invention, there may be a common association of a first and a second electronic counter 10 and 11 with a plurality of sensitive units 4 belonging to a row of said matrix or, in general, belonging to a predefined subarray.

The second processing unit 7 comprises, furthermore, an electronic calculation element (ECE) 71 operatively connected to said electronic counters 10 and 11 and configured to receive as an input the results of said counts UP and DOWN and to perform the successive subtraction calculation. Finally, the second processing unit 7 comprises switching connection means (SCM) 72, defined "switching matrix" in technical jargon, operatively connected between said plurality of L sensitive units 4 and the $N_e$ processing elements 6. In particular, the electronic calculation element 71 (ECE) is configured so that it controls said switching connection means (SCM) 72 in such a way as to enable an electrical connection between one of the $N_u$ sensitive units 4 and one of the $N_e$ processing elements 6 based on the settings stored in said storage register 9 during the setting step and based on the number of said occurrences related to the specific sensitive unit 4.

As already mentioned above, the invention includes also the method for measuring the distance d of at least a reference object O, implemented by means of the measuring device 1 of the invention.

In particular, according to the method, a plurality of measuring operations $A_i$ is carried out in sequence, wherein each one of said measuring operations $A_i$ includes the emission, through said emission means 2, of a light radiation R directed towards the reference object O for a predetermined time interval I.

Successively, according to the method, an electrical signal S is generated by means of each one of the M sensitive units 4, following the impact of at least one photon Fp on the respective sensitive surface 41.

Furthermore, according to the method, the value of the distance d is determined by means of said first processing unit 5, based on the time of impact t of said photon Fp on at least one of the M sensitive units 4, where the time of impact t is determined by at least one of the $N_e$ processing elements 6 associated with said sensitive unit 4.

According to the method that is the subject of the invention, the electrical signals S of all of the M enabled sensitive units 4 are processed by means of the second processing unit 7, for each one of the measuring operations $A_i$, in such a way as to select, among said M sensitive units 4, a number $N_u$ of sensitive units 4 on which at least one photon Fp belonging to the light radiation R reflected by the reference element O actually impacted.

Successively, according to the method of the invention, each one of the $N_u$ sensitive units 4 selected is associated with one of the $N_e$ processing elements 6 in such a way that at the moment of the successive measuring operation $A_{i+1}$ the value of the distance d is determined based on the time of impact t of at least one of the photons Fp related to each one of said $N_u$ sensitive units 4 selected.

The method of the invention can preferably but not necessarily comprise the further operating steps illustrated in detail in the description of the measuring device 1 according to the preferred embodiment or according to the variant embodiments previously described.

According to the above, therefore, the measuring device and the measuring method that are the subjects of the invention achieve all the set objects.

In particular, the invention achieves the object to provide a measuring device that is capable of maintaining a high signal-to-noise ratio in any operating condition, even in the presence of a high luminous flux.

Consequently, the invention achieves the object to provide a measuring device that is capable of determining with high precision the value of the distance between the same device and a reference object even in the presence of a high luminous flux.

The invention also achieves the object to provide a measuring device that is capable of maintaining high precision in the determination of said distance even in case of a sudden change in the external measuring conditions.

The invention also achieves the object to provide a measuring device with a high static and dynamic fill factor.

The invention also achieves the object to provide a measuring device with limited size and simplified architecture.

Finally, the invention also achieves the object to provide a measuring device that requires moderate energy consumption.

The invention claimed is:

1. A measuring device (1) suited to measure the distance (d) of at least a reference object (O), configured so that it performs a plurality of measuring operations ($A_i$) in succession and comprising:

emission means (2) suited to emit a light radiation (R) directed towards said reference object (O) during a predetermined time interval (I) for each one of said measuring operations ($A_i$);

receiving means (3) comprising a sensitive area (31) which is sensitive to said light radiation (R) reflected by said reference object (O), said sensitive area (31) being provided with a number M of sensitive units (4), each one of said sensitive units (4) being configured to generate an electrical signal (S) following the impact of at least one photon (F) on its sensitive surface (41), wherein each one of said sensitive units (4) comprises at least one Sinie Photon Avalanche Diode (SPAD) (81, 82);

a first processing unit (5) comprising $N_e$ processing elements (6), where $N_e$ <M, each one of said $N_e$ processing elements (6) being configured to receive the electrical signal (S) generated by one of said M sensitive units (4) and to determine the time of impact (t) of said at least one photon (F) on said sensitive units (4) with respect to a reference electrical signal (clock), said first processing unit (5) being configured in such a way as to calculate, at the moment of each one of said measuring operations ($A_i$), the value of said distance (d) based on the time of impact (t) related to at least one of said M sensitive units (4), wherein the measuring device further comprises a second processing unit (7) configured in such a way as to perform the following steps at the moment of each one of said measuring operations ($A_i$):

receiving as an input said electrical signals (S) generated by said M sensitive units (4);

processing said electrical signals (S) in such a way as to select a number $N_u$ of sensitive units (4) impacted by the photons (F) belonging to said light radiation (R), where $N_u \Leftarrow N_e$;

associating each one of said $N_u$ sensitive units (4) to one of said $N_e$ processing elements (6), in such a way that, at the moment of the successive measuring operation ($A_{i+1}$), said distance (d) is determined by said first processing unit (5) based on the time of impact (t) of at least one of said photons (F) related to each one of said $N_u$ sensitive units (4) selected, wherein each one of said sensitive units (4) comprises at least two SPADs (81, 82) whose sensitive surfaces have different sizes, said second processing unit (7) being configured in such a way that, at the moment of each one of said measuring operations (Ai), said two SPADs (81, S2) of each one of said sensitive units (4) are enabled individually or jointly said time interval (I).

2. The device (1) according to claim 1, wherein said emission means (2) emit light radiation (R) of the type pulsed with a predefined number X of pulses (B) for each time interval (I) related to each one of said measuring operations ($A_i$).

3. The device (1) according to claim 1, wherein said second processing unit (7) is configured in such a way that, at the moment of each one of said measuring operations ($A_i$), said step of processing said electrical signals (S) consists in the calculation of the number of occurrences related to the impact of at least one photon (F) belonging to said light radiation (R) for each one of said M sensitive units (4) during said pre-determined time interval (I).

4. The device (1) according to claim 3, wherein said second processing unit (7) is configured to calculate said number of occurrences for each one of said M sensitive units (4) by performing, in sequence:

at least one first count (UP) of said occurrences during the emission of said light radiation (R) by said emission means (2);

at least one second count (DOWN) in the absence of said light radiation (R);

a subtraction calculation between said first count (UP) and said second count (DOWN).

5. The device (1) according to claim 3, wherein said second processing unit (7) is configured in such a way that, at the moment of each one of said measuring operations ($A_i$) and following said calculation of said number of occurrences, it selects said number $N_u$ of sensitive units (4) among said number M of sensitive units (4) based on the decreasing order of said number of said occurrences.

6. The device (1) according to claim 1, wherein said second processing unit (7) is configured to enable said two SPADs (81, 82) of each one of said sensitive units (4) individually or jointly based on the quantity of photons (F) impacting on said sensitive area (31) during the previous measuring operation ($A_{i-1}$), said number of photons (F) being determined based on said electrical signals (S) generated by said M sensitive units (4) and received as an input by said second processing unit (7).

7. The device (1) according to claim 1, wherein said $N_e$ processing elements (6) of said first processing unit (5) are $N_e$ TDCs (Time to Digital Converter).

8. The device (1) according to claim 1, wherein said sensitive area (31) of said receiving means (3) comprises a number L of sensitive units (4), said device (1) comprising a storage register (9) in which it is possible to store in advance the "enabled" or "disabled" condition of each one of said L sensitive units (4), said M sensitive units (4) being only the sensitive units (4) in said "enabled" condition, where M$\Leftarrow$L, wherein said storage register (9) can be set during the setting of said device (1).

9. The device (1) according to claim 1, wherein said second processing unit (7) is configured in such a way that, at the moment of each one of said measuring operations ($A_i$), it varies the value of the biasing voltage ($V_{bias}$) of one or more of said M sensitive units (4) in a manner which is inversely proportional to the number of photons (F) impacting said sensitive area (31) during the previous measuring operation ($A_{i-1}$), said number of photons (F) being determined based on said electrical signals (S) generated by said M sensitive units (4) and received as an input by said second processing unit (7).

10. The device (1) according to claim 1, wherein it is configured so that, at the moment of each one of said measuring operations ($A_i$), it activates said M sensitive units (4) in different time instants during said pre-determined time interval (I), based on the spatial coordinates of each one of said M sensitive units (4) on said sensitive area (31) of said receiving means (3).

11. Method for measuring the distance (d) of at least a reference object (O), said method being implemented by means of a measuring device (1) according to claim 1 and comprising the execution, in sequence, of a plurality of measuring operations ($A_i$), each one of said measuring operations ($A_i$) including the following steps:

emission of light radiation (R) directed towards said reference object (O) through said emission means (2) for a predetermined time interval (I);

generation of an electrical signal (S) through each one of said M sensitive units (4) of said receiving means (3) following the impact of at least one photon (F) on the sensitive surface (41) of said sensitive unit (4); and determination of the value of said distance (d) by means of said first processing unit (5), based on the time of impact (t) of said at least one photon (F) on at least one of said M sensitive units (4), said time of impact (t) being determined by at least one of said $N_e$ processing elements (6), wherein the method further comprises the following steps for each one of said measuring operations ($A_i$):

processing said electrical signals (S) of said M sensitive units (4) by means of said second processing unit (7), in such a way as to select, among said M sensitive units (4), said number $N_u$ of sensitive units (4) where at least one photon (F) belonging to said reflected light radiation (R) impacted; and associating each one of said $N_u$ sensitive units (4) with one of said $N_e$ processing elements (6) in such a way that, at the moment of the successive measuring operation ($A_{i+1}$), said value of said distance (d) is determined based on the time of impact (t) of at least one of said photons (F) related to each one of said $N_u$ sensitive units (4) selected.

12. A measuring device (1) suited to measure the distance (d) of at least a reference object (O), configured so that it performs a plurality of measuring operations ($A_i$) in succession and comprising:

emission means (2) suited to emit a light radiation (R) directed towards said reference object (O) during a predetermined time interval (I) for each one of said measuring operations ($A_i$);

receiving means (3) comprising a sensitive area (31) which is sensitive to said light radiation (R) reflected by said reference object (O), said sensitive area (31) being provided with a number M of sensitive units (4), each one of said sensitive units (4) being configured to generate an electrical signal (S) following the impact of at least one photon (F) on its sensitive surface (41);

a first processing unit (5) comprising $N_e$ processing elements (6), where $N_e < M$, each one of said $N_e$ processing elements (6) being configured to receive the electrical signal (S) generated by one of said M sensitive units (4) and to determine the time of impact (t) of said at least one photon (F) on said sensitive units (4) with respect to a reference electrical signal (clock), said first processing unit (5) being configured in such a way as to calculate, at the moment of each one of said measuring operations ($A_i$), the value of said distance (d) based on the time of impact (t) related to at least one of said M sensitive units (4), wherein the measuring device further comprises a second processing unit (7) configured in such a way as to perform the following steps at the moment of each one of said measuring operations ($A_i$):

receiving as an input said electrical signals (S) generated by said M sensitive units (4);

processing said electrical signals (S) in such a way as to select a number $N_u$ of sensitive units (4) impacted by the photons (F) belonging to said light radiation (R), where $N_u \Leftarrow N_e$;

associating each one of said $N_u$ sensitive units (4) to one of said $N_e$ processing elements (6), in such a way that, at the moment of the successive measuring operation ($A_{i+1}$), said distance (d) is determined by said first processing unit (5) based on the time of impact (t) of at least one of said photons (F) related to each one of said $N_u$ sensitive units (4) selected, and wherein said sensitive area (31) of said receiving means (3) comprises a number L of sensitive units (4), said device (1) comprising a storage register (9) in which it is possible to store in advance the "enabled" or "disabled" condition of each one of said L sensitive units (4), said M sensitive units (4) being only the sensitive units (4) in said "enabled" condition, where $M \Leftarrow L$, wherein said storage register (9) can be set during the setting of said device (1).

13. The device (1) according to claim 12, wherein it is configured so that, at the moment of each one of said measuring operations ($A_i$), it activates said M sensitive units (4) in different time instants during said pre-determined time interval (I), based on the spatial coordinates of each one of said M sensitive units (4) on said sensitive area (31) of said receiving means (3).

14. A measuring device (1) suited to measure the distance (d) of at least a reference object (O), configured so that it performs a plurality of measuring operations ($A_i$) in succession and comprising:

emission means (2) suited to emit a light radiation (R) directed towards said reference object (O) during a predetermined time interval (I) for each one of said measuring operations ($A_i$);

receiving means (3) comprising a sensitive area (31) which is sensitive to said light radiation (R) reflected by said reference object (O), said sensitive area (31) being provided with a number M of sensitive units (4), each one of said sensitive units (4) being configured to generate an electrical signal (S) following the impact of at least one photon (F) on its sensitive surface (41);

a first processing unit (5) comprising $N_e$ processing elements (6), where $N_e < M$, each one of said $N_e$ processing elements (6) being configured to receive the electrical signal (S) generated by one of said M sensitive units (4) and to determine the time of impact (t) of said at least one photon (F) on said sensitive units (4) with respect to a reference electrical signal (clock), said first processing unit (5) being configured in such a way as to calculate, at the moment of each one of said measuring operations ($A_i$), the value of said distance (d) based on the time of impact (t) related to at least one of said M sensitive units (4), wherein the measuring device further comprises a second processing unit (7) configured in such a way as to perform the following steps at the moment of each one of said measuring operations ($A_i$):

receiving as an input said electrical signals (S) generated by said M sensitive units (4);

processing said electrical signals (S) in such a way as to select a number $N_u$ of sensitive units (4) impacted by the photons (F) belonging to said light radiation (R), where $N_u \Leftarrow N_e$;

associating each one of said $N_u$ sensitive units (4) to one of said $N_e$ processing elements (6), in such a way that, at the moment of the successive measuring operation ($A_{i+1}$), said distance (d) is determined by said first processing unit (5) based on the time of impact (t) of at least one of said photons (F) related to each one of said $N_u$ sensitive units (4) selected, and wherein said second processing unit (7) is configured in such a way that, at the moment of each one of said measuring operations ($A_i$), it varies the value of the biasing voltage ($V_{bias}$) of one or more of said M sensitive units (4) in a manner which is inversely proportional to the number of photons (F) impacting said sensitive area (31) during the previous measuring operation ($A_{i+1}$), said number of photons (F) being determined based on said electrical signals (S) generated by said M sensitive units (4) and received as an input by said second processing unit (7).

15. The device (1) according to claim 14, wherein it is configured so that, at the moment of each one of said measuring operations ($A_i$), it activates said M sensitive units (4) in different time instants during said pre-determined time interval (I), based on the spatial coordinates of each one of said M sensitive units (4) on said sensitive area (31) of said receiving means (3).

* * * * *